US012606750B2

(12) United States Patent　　　　(10) Patent No.: US 12,606,750 B2
Alfilfil et al.　　　　　　　　　　　(45) Date of Patent: Apr. 21, 2026

(54) CATALYST COMPOSITIONS THAT INCLUDE ZEOLITES WITH DIFFERENT SILICA TO ALUMINA MOLAR RATIOS

(71) Applicant: Saudi Arabian Oil Company, Dhahran (SA)

(72) Inventors: Lujain R. Alfilfil, Thuwal (SA); Khalid Ali Almajnouni, Jeddah (SA); Isidoro Morales Osorio, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 149 days.

(21) Appl. No.: 18/483,945

(22) Filed: Oct. 10, 2023

(65) Prior Publication Data

US 2025/0115814 A1　　Apr. 10, 2025

(51) Int. Cl.
*C10G 11/18*　　　　(2006.01)
*B01J 21/04*　　　　(2006.01)
(Continued)

(52) U.S. Cl.
CPC .............. *C10G 11/18* (2013.01); *B01J 21/04* (2013.01); *B01J 21/08* (2013.01); *B01J 21/16* (2013.01);
(Continued)

(58) Field of Classification Search
CPC .............. C10G 11/18; C10G 2400/02; C10G 2400/20; C10G 11/05; C10G 11/02;
(Continued)

(56) References Cited

U.S. PATENT DOCUMENTS

| | | | |
|---|---|---|---|
| 2,348,699 | A | 5/1944 | Tuttle |
| 2,429,359 | A | 10/1947 | Kassel |

(Continued)

FOREIGN PATENT DOCUMENTS

| | | |
|---|---|---|
| CN | 102086402 A | 6/2011 |
| WO | 0179392 A2 | 10/2001 |

(Continued)

OTHER PUBLICATIONS

Notification of Transmittal of the International Search Report and the Written Opinion of the International Searching Authority, or the Declaration dated Nov. 28, 2024 pertaining to International application No. PCT/US2024/049692 filed Oct. 3, 2024, pp. 1-14.

(Continued)

*Primary Examiner* — Randy Boyer
*Assistant Examiner* — Juan C Valencia
(74) *Attorney, Agent, or Firm* — DINSMORE & SHOHL LLP

(57)　　　　ABSTRACT

According to embodiments a catalyst composition may include from 10 wt. % to 50 wt. % of matrix material, from 10 wt. % to 30 wt. % of binder, and from 30 wt. % to 70 wt. % of a zeolite mixture. The zeolite mixture may comprise at least a first portion of zeolite and a second portion of zeolite. The first portion of zeolite may consist of zeolite having a silica to alumina molar ratio in a first range and the second portion of zeolite may consist of zeolite having a silica to alumina molar ratio in a second range. The silica to alumina molar ratio range of the first portion of zeolite and the silica to alumina molar ratio range of the second portion of zeolite do not overlap and may be separated by at least 5.

20 Claims, 1 Drawing Sheet

(51) Int. Cl.

| | |
|---|---|
| *B01J 21/08* | (2006.01) |
| *B01J 21/16* | (2006.01) |
| *B01J 29/08* | (2006.01) |
| *B01J 29/40* | (2006.01) |
| *B01J 29/80* | (2006.01) |
| *B01J 35/40* | (2024.01) |

(52) U.S. Cl.

CPC ............. *B01J 29/084* (2013.01); *B01J 29/40* (2013.01); *B01J 29/80* (2013.01); *B01J 35/40* (2024.01); *C10G 2400/02* (2013.01); *C10G 2400/20* (2013.01)

(58) Field of Classification Search

CPC ... B01J 21/04; B01J 21/08; B01J 21/16; B01J 29/084; B01J 29/40; B01J 29/80; B01J 35/40; B01J 37/0009; B01J 2229/42; B01J 29/70; B01J 2029/062; B01J 35/30; B01J 35/77; B01J 21/12

See application file for complete search history.

(56) References Cited

U.S. PATENT DOCUMENTS

| | | | |
|---|---|---|---|
| 2,561,334 | A | 7/1951 | Bowles et al. |
| 2,862,871 | A | 12/1958 | Smith |
| 2,882,206 | A | 4/1959 | Martin et al. |
| 2,929,744 | A | 3/1960 | Mathes et al. |
| 3,498,907 | A | 3/1970 | Doelp, Jr. et al. |
| 3,551,513 | A | 12/1970 | Yuichi et al. |
| 3,650,946 | A | 3/1972 | Mourning |
| 3,708,552 | A | 1/1973 | Kunii et al. |
| 3,799,866 | A | 3/1974 | Lengemann |
| 3,837,822 | A | 9/1974 | Ward |
| 4,087,350 | A | 5/1978 | Kolombos et al. |
| 4,247,987 | A | 2/1981 | Coulaloglou et al. |
| 4,259,175 | A | 3/1981 | Mcarthur |
| 4,340,465 | A | 7/1982 | Miller et al. |
| 4,552,645 | A | 11/1985 | Gartside et al. |
| 5,462,652 | A | 10/1995 | Wegerer |
| 5,944,982 | A | 8/1999 | Lomas |
| 6,656,346 | B2 | 12/2003 | Ino et al. |
| 6,797,851 | B2 * | 9/2004 | Martens ................... C07C 1/20 |
| | | | 585/639 |
| 6,869,521 | B2 | 3/2005 | Lomas |
| 7,425,258 | B2 | 9/2008 | Chen et al. |
| 7,479,218 | B2 | 1/2009 | Letzsch |
| 7,658,837 | B2 | 2/2010 | Soares Cerqueira et al. |
| 9,771,530 | B2 | 9/2017 | Sayed et al. |
| 11,725,149 | B1 * | 8/2023 | Jin ......................... C10G 11/18 |
| | | | 208/113 |
| 2004/0065591 | A1 | 4/2004 | Rockwell |
| 2007/0205139 | A1 | 9/2007 | Kulprathipanja et al. |
| 2009/0101543 | A1 | 4/2009 | Shen et al. |
| 2011/0108458 | A1 | 5/2011 | Leonard et al. |
| 2012/0083640 | A1 * | 4/2012 | Chewter ................. B01J 35/40 |
| | | | 502/67 |
| 2012/0291340 | A1 | 11/2012 | Boon et al. |
| 2014/0014555 | A1 | 1/2014 | Marri et al. |
| 2016/0160134 | A1 | 6/2016 | Voolapalli et al. |
| 2019/0316041 | A1 | 10/2019 | Tian et al. |
| 2019/0316047 | A1 | 10/2019 | Al-Majnouni et al. |
| 2021/0179514 | A1 | 6/2021 | Thinon et al. |
| 2021/0317373 | A1 | 10/2021 | Gong et al. |

FOREIGN PATENT DOCUMENTS

| | | | |
|---|---|---|---|
| WO | 2010133643 | A2 | 11/2010 |
| WO | 2013089885 | A1 | 6/2013 |
| WO | 2014011759 | A1 | 1/2014 |
| WO | 2018156427 | A1 | 8/2018 |
| WO | 2020109885 | A1 | 6/2020 |
| WO | 2021019445 | A1 | 2/2021 |
| WO | 2021019465 | A1 | 2/2021 |

OTHER PUBLICATIONS

Abdullah et al., "Composition-performance relationships in catalysts formulation for the direct conversion of crude oil to chemicals" Wiley-VCH, ChemCatChem, 10.1002/cctc.202001738, 2021.

Jakobsen, "Chemical Reactor Modeling", Springer, Second Edition, pp. 789-790, 1005-1017, 2014.

International Search Report pertaining to Application No. PCT/US2021/036336 dated Oct. 5, 2021, 16 pages.

International Search Report pertaining to Application No. PCT/US2022/051206 dated Mar. 15, 2023, 13 pages.

* cited by examiner

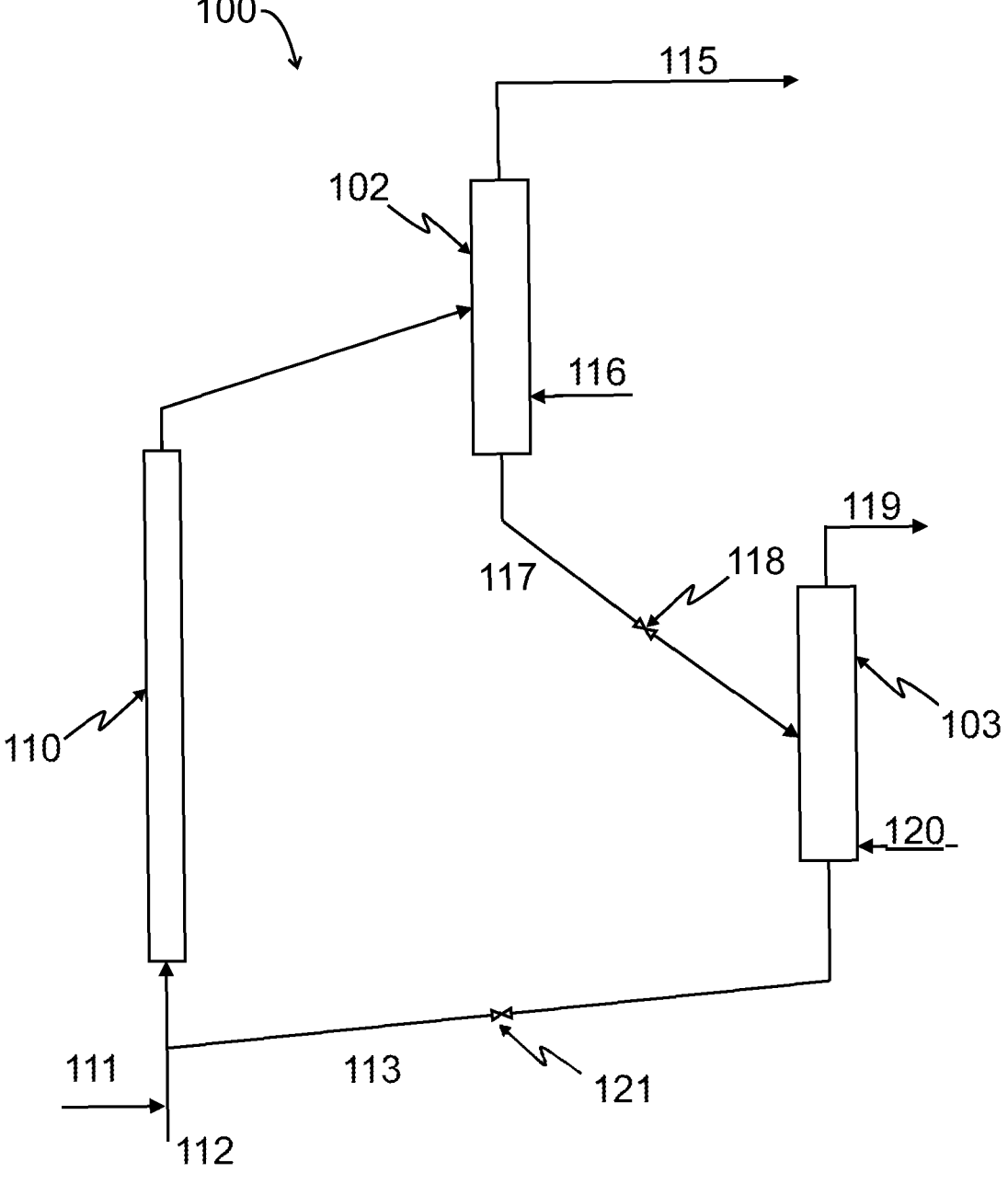

CATALYST COMPOSITIONS THAT INCLUDE ZEOLITES WITH DIFFERENT SILICA TO ALUMINA MOLAR RATIOS

FIELD

The embodiments described herein generally relate to chemical processing and, more particularly, to catalysts.

BACKGROUND

Materials that include pores, such as zeolites, may be utilized in many petrochemical industrial applications. For instance, such materials may be utilized as catalysts in a number of reactions that convert hydrocarbons or other reactants from feed chemicals to product chemicals. Zeolites may be characterized by a microporous structure framework type. Various types of zeolites have been identified over the past several decades, where zeolite types are generally described by framework types, and where specific zeolitic materials may be more specifically identified by various names such as ZSM-5 or Y.

Zeolite containing catalysts and adsorbents have widespread uses in many diverse industries. Exemplary industries include the petrochemical industry in refinery, gas separation, and carbon dioxide separation and capture processes. In the petroleum industry, for example, zeolite containing catalysts may be included in processes such as fluid catalytic cracking (FCC) and hydrocracking to catalyze reactions such as hydrogenation, dehydrogenation, isomerization, alkylation, and cracking, for example. Zeolite containing adsorbents may be utilized in the separation of paraffins or aromatic isomers, and in drying processes to remove water and other impurities from hydrocarbon streams.

SUMMARY

Embodiments of the present disclosure are directed to catalyst compositions comprising zeolites having different silica to alumina molar ratios. In particular, the catalyst compositions may comprise a zeolite mixture comprising first and second portions of zeolite having different silica to alumina molar ratios. It has been discovered that the silica to alumina ratio of a zeolite may affect the catalytic selectivity of the zeolite. For example, a zeolite with a relatively higher silica to alumina ratio may improve the selectivity of the catalyst composition towards light olefins when the catalyst composition is used to process a hydrocarbon feedstock. However, a zeolite with a relatively higher silica to alumina ratio may have a lower overall conversion of the hydrocarbon feedstock when compared to a catalyst composition with a relatively lower silica to alumina ratio. The embodiments described herein incorporate multiple zeolite portions with different silica to alumina ratios. In some embodiments, the catalyst compositions can have improved selectivity while still having sufficient overall conversion.

According to one or more embodiments disclosed herein a catalyst composition may comprise from 10 wt. % to 50 wt. % of matrix material, from 10 wt. % to 30 wt. % of binder, and from 30 wt. % to 70 wt. % of a zeolite mixture. The zeolite mixture may comprise all zeolite in the catalyst composition. The zeolite mixture may comprise at least a first portion of zeolite and a second portion of zeolite. The first portion of zeolite may consist of zeolite having a silica to alumina molar ratio in a first range and may comprise at least 10 wt. % of the zeolite mixture. The second portion of zeolite may consist of zeolite having a silica to alumina molar ratio in a second range and comprises at least 10 wt. % of the zeolite mixture. The silica to alumina molar ratio range of the first portion of zeolite and the silica to alumina molar ratio range of the second portion of zeolite do not overlap and may be separated by at least 5. The midpoint of the silica to alumina molar ratio range of the second portion of zeolite less the midpoint of the silica to alumina molar ratio range of the first portion of zeolite may equal at least 15.

It is to be understood that both the preceding general description and the following detailed description describe various embodiments and are intended to provide an overview or framework for understanding the nature and character of the claimed subject matter. Additional features and advantages of the embodiments will be set forth in the detailed description and, in part, will be readily apparent to persons of ordinary skill in the art from that description, which includes the accompanying drawings and claims, or recognized by practicing the described embodiments. The drawings are included to provide a further understanding of the embodiments and, together with the detailed description, serve to explain the principles and operations of the claimed subject matter. However, the embodiments depicted in the drawings are illustrative and exemplary in nature, and not intended to limit the claimed subject matter.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 1 schematically depicts a reactor system according to one or more embodiments of the present disclosure.

When describing the simplified schematic illustration of FIG. 1, the numerous valves, temperature sensors, electronic controllers, and the like, which may be used and are well known to a person of ordinary skill in the art, are not included. Further, accompanying components that are often included in such reactor systems, such as air supplies, heat exchangers, surge tanks, and the like are also not included. However, it should be understood that these components are within the scope of the present disclosure.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components that are in hydrocracking units, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component. It should be understood that arrows in the relevant figures are not indicative of necessary or essential steps.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some of which are illustrated in the accompanying drawing.

DETAILED DESCRIPTION

One or more embodiments presently described herein are directed to catalyst compositions comprising a zeolite mixture comprising at least first and second portions of zeolite, wherein the first portion of zeolite has a silica to alumina molar ratio ("SAR") in a first range and the second portion has an SAR in a second range, where the first range and the second range do not overlap and the midpoint of the second range less the midpoint of the first range equals at least 15. Generally, such embodiments include a wider dispersion of SARs in the catalyst as compared to a catalyst that utilizes only a single SAR zeolite. As described herein, and particularly with respect to the Examples that follow, the catalysts described herein may have improved selectivity while still having sufficient overall conversion.

As used throughout this disclosure, "zeolites" or "zeolite materials" generally refer to micropore-containing inorganic materials with regular intra-crystalline cavities and channels of molecular dimension, as would be understood by those skilled in the art. Zeolites generally comprise a crystalline structure, as opposed to an amorphous structure. The microporous structure of zeolites may render large surface areas and desirable size-/shape-selectivity, which may be advantageous for catalysis. Accordingly, zeolites may be utilized in many petrochemical industrial applications, such as, for instance, reactions that convert hydrocarbons or other reactants from feed chemicals to product chemicals by cracking.

According to one or more embodiments, the zeolites may be aluminosilicates, meaning that they have a crystalline structure that include silica and alumina. The molar ratio of silica to alumina of a zeolite can affect the properties of the zeolite when the zeolite is used in a chemical reaction. For example, a zeolite with a relatively high silica to alumina molar ratio may be more selective towards the production of light olefins when used as a catalyst to process a hydrocarbon feedstock. However, a relatively high SAR zeolite may also have a lower overall hydrocarbon conversion than a zeolite with a relatively lower SAR The catalyst compositions of the present disclosure that comprise a zeolite mixture can overcome this problem by including portions of zeolite with different SARs to balance selectivity and overall conversion.

In one or more embodiments, the catalyst composition may comprise, consist essentially of, or consist of from 10 wt. % to 50 wt. % of matrix material, from 10 wt. % to 30 wt. % of binder, and from 30 wt. % to 70 wt. % of a zeolite mixture. As described herein, the zeolite mixture comprises all zeolite in the catalyst composition. The zeolite mixture may comprise at least a first portion of zeolite and a second portion of zeolite. The first portion of zeolite consists of zeolite that may have a silica to alumina molar ratio in a first range. The second portion of zeolite consists of zeolite having a silica to alumina molar ratio in a second range. The silica to alumina molar ratio range of the first portion of zeolite and the silica to alumina molar ratio range of the second portion of zeolite do not overlap. The midpoint of the silica to alumina molar ratio range of the second portion of zeolite less the midpoint of the silica to alumina molar ratio range of the first portion of zeolite equals at least 15. Each of the first portion of zeolite and the second portion of zeolite may comprise at least 20 wt. % of the zeolite mixture.

As described hereinabove, in one or more embodiments the catalyst composition may include from 30 wt. % to 70 wt. % of a zeolite mixture. For example, the catalyst composition may include from 30 wt. % to 35 wt. % of the zeolite mixture, from 35 wt. % to 40 wt. % of the zeolite mixture, from 40 wt. % to 45 wt. % of the zeolite mixture, from 45 wt. % to 50 wt. % of the zeolite mixture, from 50 wt. % to 55 wt. % of the zeolite mixture, from 55 wt. % to 60 wt. % of the zeolite mixture, from 60 wt. % to 65 wt. % of the zeolite mixture, from 65 wt. % to 70 wt. % of the zeolite mixture, or from any combination of one or more of these ranges.

The zeolite mixture may comprise at least a first portion of zeolite and a second portion of zeolite, as described herein. In one or more embodiments, the zeolite mixture may further comprise a third portion of zeolite. In still more embodiments, the zeolite mixture may further comprise a fourth portion of zeolite. Each portion of the zeolite mixture may have an SAR range that does not overlap the SAR range of any other portion of zeolite in the zeolite mixture. In one or more embodiments, the first portion of zeolite may consist of zeolite having a first SAR range and the second portion of zeolite may consist of zeolite having a second SAR range. The midpoint of the second SAR range less the midpoint of the first SAR range may equal at least 15, such as, for example, at least 20, at least 25, at least 30, at least 35, at least 40, at least 45, or even at least 50. Without being bound by theory it is believed that if the midpoint of the second SAR range less the midpoint of the first SAR range is less than 15 the catalyst composition may have reduced selectivity or overall conversion when used to process a hydrocarbon feedstock when compared to catalyst composition comprising a zeolite mixture where the midpoint of the second SAR range less the midpoint of the first SAR range is at least 15.

As described hereinabove, the zeolite mixture may further comprise a third portion of zeolite. The third portion of zeolite may consist of zeolite having an SAR in a third range. The third SAR range may not overlap the second SAR range. In one or more embodiment the midpoint of the third SAR range less the midpoint of the second SAR range may be at least 15, such as, for example, at least 20, at least 25, at least 30, at least 35, at least 40, at least 45, or even at least 50. In one or more embodiments, the zeolite mixture may further comprise a fourth portion of zeolite. The fourth portion of zeolite may consist of zeolite having a fourth SAR range. The fourth SAR range may not overlap the third SAR range. The midpoint of the fourth SAR range less the midpoint of the third SAR range may be at least 15 such as, for example, at least 20, at least 25, at least 30, at least 35, at least 40, at least 45, or even at least 50.

In one or more embodiments, the first and second portions of zeolite may have a midpoint SAR of from 1 to 500 such as, for example, from 1 to 25, from 25 to 50, from 50 to 75, from 75 to 100, from 100 to 125, from 125 to 150, from 150 to 175, from 175 to 200, from 200 to 225, from 225 to 250, from 250 to 275, from 275 to 300, from 300 to 325, from 325 to 350, from 350 to 375, from 375 to 400, from 400 to 425, from 425 to 450, from 450 to 475, from 475 to 500, or from any combination of one or more of these ranges. In one or more embodiments, the first portion of zeolite may have an SAR of from 25 to 35 and the second portion of zeolite may have an SAR of from 250 to 300. In other embodiments, the first portion of zeolite may have an SAR of from 25 to 35, the second portion of zeolite may have an SAR of from 40 to 60, and the third portion of zeolite may have an SAR of from 70 to 90. In other embodiments, the first portion of zeolite may have an SAR of from 25 to 35, the second portion of zeolite may have an SAR of from 70 to 90, and the third portion of zeolite may have an SAR of from 250 to 300. In other embodiments, the first portion of zeolite may have an SAR of from 40 to 60, the second portion of zeolite may have an SAR of from 70 to 90, and the third portion of zeolite may have an SAR of from 250 to 300.

In one or more embodiments, the SAR of the first portion of zeolite and the SAR of the second portion of zeolite may be separated by at least 5, such as, for example, at least 10, at least 15, at least 20, at least 25, at least 30, at least 35, at least 40, at least 45, or even at least 50.

Based on the SAR of the first and second portions of zeolite the SAR range of the third and fourth portions can vary, but can be from greater than 35 to greater than 500, such as from greater than 35 to greater than 50, from greater than 50 to greater than 75, from greater than 75 to greater than 100, from greater than 100 to greater than 125, from greater than 125 to greater than 150, from greater than 150 to greater than 175, from greater than 175 to greater than 200, from greater than 200 to greater than 225, from greater than 225 to greater than 250, from greater than 250 to greater than 275, from greater than 275 to greater than 300, from greater than 300 to greater than 325, from greater than 325 to greater than 350, from greater than 350 to greater than 375, from greater than 375 to greater than 400, from greater than 400 to greater than 425, from greater than 425 to greater than 450, from greater than 450 to greater than 475, from greater than 475 to greater than 500, or from any combination of one or more of these ranges.

The first, second, third, and fourth portions of zeolite may comprise any framework type of zeolite that has an appropriate SAR as described hereinabove. In one or more embodiments, one or more of the first, second, third and fourth portions of zeolite may comprise a ZSM-5 zeolite. As used throughout this disclosure, "ZSM-5" generally refers to zeolites having an MFI framework type according to the IZA zeolite nomenclature and consisting majorly of silica and alumina, as is understood by those skilled in the art. ZSM-5 refers to "Zeolite Socony Mobil-5" and is a pentasil family zeolite that can be represented by the chemical formula $Na_nAl_nSi_{96}-nO_{192}\cdot16H_2O$, where $0<n<27$. In one or more embodiments, one or more of the first, second, third, and fourth portions of zeolite may comprise a zeolite Y. As used throughout this disclosure, "zeolite Y" and "USY" refer to a zeolite having a FAU framework type according to the IZA zeolite nomenclature and consisting majorly of silica and alumina, as would be understood by one skilled in the art.

In one or more embodiments, each of the first portion of zeolite and the second portion of zeolite may comprise at least 10 wt. % of the zeolite mixture. For example, each of the first portion of zeolite and the second portion of zeolite may comprise at least 15 wt. % of the zeolite mixture, at least 20 wt. % of the zeolite mixture, at least 25 wt. % of the zeolite mixture, at least 30 wt. % of the zeolite mixture, at least 35 wt. % of the zeolite mixture, at least 40 wt. % of the zeolite mixture, at least 45 wt. % of the zeolite mixture, or even 50 wt. % of the zeolite mixture. It should be understood that the wt. % of the first portion of zeolite and the wt. % of the second portion of zeolite may be the same or may be different. In some embodiments, the first portion of zeolite and the second portion of zeolite may each independently comprise from 10 wt. % to 90 wt. %, such as from 10 wt. % to 20 wt. %, from 20 wt. % to 30 wt. %, from 30 wt. % to 40 wt. %, from 40 wt. % to 50 wt. %, from 50 wt. % to 60 wt. %, from 60 wt. % to 70 wt. %, from 70 wt. % to 80 wt. %, from 80 wt. % to 90 wt. %, or from any combination of one or more of these ranges.

In one or more embodiments, the catalyst composition may comprise one or more binder materials, such as alumina-containing compounds or silica-containing compounds (including compounds containing alumina and silica). As used throughout this disclosure, "binder materials" refer to materials that may serve to "glue" or otherwise hold zeolite and the matrix together in the microsphere. It may improve the attrition resistance of the catalyst particle. For example, the binder material may comprise alumina (such as amorphous alumina), silica-alumina (such as amorphous silica-alumina), or silica (such as amorphous silica). According to one or more embodiments, the binder material may comprise pseudoboehmite. As used in this disclosure, "pseudoboehmite" refers to an aluminum-containing compound with the chemical composition AlO(OH) consisting of crystalline boehmite. Suitable pseudoboehmite includes CATAPAL® aluminas, commercially available from Sasol Limited of Johannesburg, South Africa. Boehmite refers to aluminum oxide hydroxide as well, but pseudoboehmite generally has a greater amount of water than boehmite. The binder material, such as pseudoboehmite, may be peptized with an acid, such as a mono-protic acid, such as nitric acid ("HNO₃") or hydrochloric acid ("HCl").

According to one or more embodiments, the catalyst composition may comprise from 10 wt. % to 30 wt. % of binder. For example, the catalyst composition may comprise from 10 wt. % to 15 wt. % of binder, from 15 wt. % to 20 wt. % of binder, from 20 wt. % to 25 wt. % of binder, from 25 wt. % to 30 wt. % of binder, or from any combination of one or more of these ranges. It should be understood that, in one or more embodiments, the catalyst composition may include any single disclosed binder material in an amount of the discloses wt. % ranges. In additional embodiments, the catalyst composition may include any two or more binder materials in combination in any amount of the disclosed wt. % ranges.

In one or more embodiments, the catalyst composition may comprise one or more matrix materials. As used throughout this disclosure, "matrix materials" may refer to a clay material such as kaolin. Without being bound by theory, it is believed that the matrix materials of the catalyst composition serve both physical and catalytic functions. Physical functions include providing particle integrity and attrition resistance, acting as a heat transfer medium, and providing a porous structure to allow diffusion of hydrocarbons into and out of the catalyst microspheres. The matrix can also affect catalyst selectivity, product quality and resistance to poisons. The matrix materials may tend to exert its strongest influence on overall catalytic properties for those reactions, which directly involve relatively large molecules.

In one or more embodiments, the matrix material comprises kaolin. As used in this disclosure, "kaolin" refers to a clay material that has a relatively large amount (such as at least about 50 wt. %, at least 60 wt. %, at least 70 wt. %, at least 80 wt. %, at least 90 wt. %, or even at least 95 wt. %) of kaolinite, which can be represented by the chemical formula Al₂Si₂O₅(OH)₄. Kaolin is sometimes referred to as "china clay." In additional embodiments, the matrix material may comprise other clay materials.

In one or more embodiments, the catalyst composition may comprise from 10 wt. % to 50 wt. % of matrix material. For example, the catalyst composition may comprise from 10 wt. % to 15 wt. % of matrix material, from 15 wt. % to 20 wt. % of matrix material, from 20 wt. % to 25 wt. % of matrix material, from 25 wt. % to 30 wt. % of matrix material, from 30 wt. % to 35 wt. % of matrix material, from 35 wt. % to 40 wt. % of matrix material, from 40 wt. % to 45 wt. % of matrix material, from 45 wt. % to 50 wt. % of matrix material, or any combination of one or more of these ranges. It should be understood that, in one or more embodiments, the cracking catalyst may include any single discloses matrix material in an amount of the disclosed wt. % ranges. In additional embodiments, the cracking catalyst may include any two or more matrix materials in combination in an amount of the disclosed wt. % ranges.

Additives may be added to the formulation to achieve specific properties due to their superior chemical inertness, high thermal and shock resistance, low thermal expansion, and superior thermal conductivity. Metal carbides (MC) in the formulation may act as diluents that increase the density of the catalyst particle and improve its thermal conductivity. Better thermal conductivities aid in stabilizing the temperature profile of the catalyst bed and reduce cold/hot spots. In one or more embodiments, the catalyst composition may further comprise silicon carbide particles. In one or more embodiments, the catalyst composition may further comprise from 1 wt. % to 40 wt. % of silicon carbide particles. For example, the catalyst composition may comprise from 1 wt. % to 5 wt. %, from 5 wt. % to 10 wt. % of silicon carbide particles, from 10 wt. % to 15 wt. % of silicon carbide particles, from 15 wt. % to 20 wt. % of silicon carbide particles, from 20 wt. % to 25 wt. % of silicon carbide particles, from 25 wt. % to 30 wt. % of silicon carbide particles, from 30 wt. % to 35 wt. % of silicon carbide particles, from 35 wt. % to 40 wt. % of silicon carbide particles, or from any combination of one or more of these ranges. In one or more embodiments, the silicon carbide particles may have an average particle size of from 50 nm to 900 nm. For example the silicon carbide particles may have an average particle size of from 50 nm to 100 nm, from 100 nm to 150 nm, from 150 nm to 200 nm, from 200 nm to 250 nm, from 250 nm to 300 nm, from 300 nm to 350 nm, from 350 nm to 400 nm, from 400 nm to 450 nm, from 450 nm to 500 nm, from 500 nm to 550 nm, from 550 nm to 600 nm, from 600 nm to 650 nm, from 650 nm to 700 nm, from 700 nm to 750 nm, from 750 nm to 800 nm, from 800 nm to 850 nm, from 850 nm to 900 nm, or from any combination of one or more of these ranges.

In one or more embodiments, the catalyst composition may be formed as particles. The particles may be shaped particles, such as spheres, or may be inconsistent in shape or otherwise globular in shape. The size of a particle refers to the maximum length of a particle from one side to another, measured along the longest distance of the particle. For example, a spherically shaped particle has a size equal to its diameter, or a rectangular prism shaped particle has a maximum length equal to the hypotenuse stretching from opposite corners. The particles of the catalyst composition may have an average diameter of from 0.05 microns to 100 microns, such as from 0.05 microns to 1 micron, from 1 micron to 10 microns, from 10 microns to 20 microns, from 20 microns to 30 microns, from 30 microns to 40 microns, from 40 microns to 50 microns, from 50 microns to 60 microns, from 60 microns to 70 microns, from 70 microns to 80 microns, from 80 microns to 90 microns, from 90 microns to 100 microns, or from any combination of one or more of these ranges. Average particle size can be measured using laser diffraction analysis.

In one or more embodiments, the first and second portions of zeolite may be present on the same particle. In other embodiments, the first and second portions of zeolite may each be present on different particles. In one or more embodiments, the first, second, third, and fourth portions of zeolite may be present on the same or different particles in any combination, such as, for example, the first and second portions of zeolite present together on one type of particles and the third and fourth portions of zeolite present together on a different type of particles.

In one or more embodiments, the catalyst composition of the present disclosure may be used to process hydrocarbons.

In one or more embodiments, a method for processing hydrocarbons may comprise passing a hydrocarbon feedstock into a reactor, contacting the hydrocarbon feedstock with the catalyst compositions of the present disclosure to produce a product stream, and passing the product stream out of the reactor. Now turning to FIG. 1, an example fluid catalytic cracking (FCC) system that may be utilized with the catalyst compositions and methods of the present disclosure is shown. In FIG. 1 the FCC system 100 includes a line 111 through which a hydrocarbon feedstock is supplied. The hydrocarbon feedstock may generally comprise a hydrocarbon material. In embodiments, the hydrocarbon material of the hydrocarbon feed stream may be crude oil. As used in this disclosure, the term "crude oil" is to be understood to mean a mixture of petroleum liquids, gases, or combinations of liquids and gases, including some embodiments impurities such as sulfur-containing compounds, nitrogen-containing compounds and metal compounds that has not undergone significant separation or reaction processes. Crude oils are distinguished from fractions of crude oil. In certain embodiments, the crude oil feedstock may be a minimally treated light crude oil to provide a crude oil feedstock having total metals (Ni+V) content of less than 20 parts per million by weight (ppmw) and Conradson carbon residue of less than 10 wt %. Such minimally treated materials may be considered crude oils as described herein.

While the present description and examples may specify crude oil as the hydrocarbon material of the hydrocarbon feedstock, it should be understood that FCC system 100 described with respect to the embodiments of FIG. 1, may be applicable for the conversion of a wide variety of hydrocarbon materials, which may be present in the hydrocarbon feedstock, including, but not limited to, crude oil, vacuum residue, tar sands, bitumen, atmospheric residue, vacuum gas oils, demetallized oils, naphtha streams, other hydrocarbon streams, or combinations of these materials. The hydrocarbon feedstock may include one or more non-hydrocarbon constituents, such as one or more heavy metals, sulphur compounds, nitrogen compounds, inorganic components, or other non-hydrocarbon compounds. If the hydrocarbon feedstock is crude oil, it may have an American Petroleum Institute (API) gravity of from 22 degrees to 40 degrees. For example, the hydrocarbon feedstock utilized may be an Arab heavy crude oil. (API gravity of approximately) 28°, Arab medium (API gravity of approximately) 30°, Arab light (API gravity of approximately 33°), or Arab extra light (API gravity of approximately 39°). It should be understood that, as used in this disclosure, a "hydrocarbon feedstock" may refer to a raw hydrocarbon material which has not been previously treated, separated, or otherwise refined (such as crude oil) or may refer to a hydrocarbon material which has undergone some degree of processing, such as treatment, separation, reaction, purifying, or other operation, prior to being introduced to the FCC system 100 from line 111.

In general, the contents of the hydrocarbon feedstock may include a relatively wide variety of chemical species based on boiling point. For example, the hydrocarbon feed stream 102 may have composition such that the difference between the 5 wt. % boiling point and the 95 wt. % boiling point of the hydrocarbon feed stream 102 is at least 100° C., at least 200° C., at least 300° C., at least 400° C., at least 500° C., or even at least 600° C.

Referring back to FIG. 1, the feedstock enters into a line 112, which carries steam or gas, for dilution. The mixture enters then a riser 110, which is a reaction zone. A regenerated catalyst, which may be the catalyst composition of the present disclosure, is also supplied to the riser 110 through a line 113. The steam or gas, when mixed with the feedstock, increases the selectivity of the light olefin hydrocarbons while making the flow of the regenerated catalyst efficient. The regenerated catalyst is supplied along line 113 from a regenerator 103, which is a separate entity from the riser 110. The temperature inside the regenerator 103 needs to be high to achieve the gasification of the feedstock.

The steam supplied by line 112 fluidizes the feedstock and catalyst, which are mixed at the bottom of the riser 110, and moves this mixture to the top of the riser while the mixture is subject to the cracking process. Because the cracking process is an endothermic process, the temperature of the mixture decreases, and thus, the temperature of the upper portion of the riser 110 is lowered. The products reaching the top of the riser 110 are then entering a stripper 102 that separates the gas products from the solid products. To increase the efficiency of the separation process, a cyclone may be used. The separated gas is removed along a line 115 and the separated catalyst is moved to the bottom of the stripper 102. Stripping steam is supplied along line 116 to the bottom portion of the stripper to remove the non-separated hydrocarbon reaction products. The catalyst is transferred along a line 117, under control of a valve 118, to the regenerator 103. In the regenerator, coke attached to the catalyst interacts with an oxidant supplied along line 120 so that the coke transforms into carbon monoxide or carbon dioxide, which is removed along line 119. The regenerated catalyst is supplied back to the riser 110 along line 113. Valve 121 controls the amount of regenerated catalyst that flows along the line 113.

During the FCC process described above, the cracking reaction is achieved in a riser or downer, where the catalyst and feedstock flow together in an entrained flow and are separated by using cyclones and strippers. The coked catalyst is regenerated in a separate vessel, which is operated at a higher temperature and residence time. Other suitable systems that may utilize the catalyst compositions of the present disclosure include those described in U.S. Pat. No. 11,445,625, U.S. Patent Publication No. 2022/0033714, and U.S. application Ser. No. 18/059,761 the entireties of which are incorporated by reference herein.

EXAMPLES

The various embodiments of the catalyst compositions described will be further clarified by the following examples. The examples are illustrative in nature, and should not be to limit the subject matter of the present disclosure.

Example 1—Catalyst Composition Preparation

A number of catalyst compositions were prepared with varying amounts of ZSM-5 zeolites having specific SARs. The ZSM-5 zeolites were added to a homogenous liquid slurry of kaolin clay, alumina, and distilled water. Then silica was added to the formed gel. The mixture was mechanically mixed until a homogenous mixture was achieved. The catalyst compositions were then calcined at 550° C. for 4-6 hours. The exact compositions of the catalyst compositions were recorded in Table 1. Further, all examples included additional particles that were produced similarly to that of the ZSM-5 particles, but had zeolite y added to the homogenous liquid slurry instead of ZSM-5. The composition of these particles was recorded in Table 2.

TABLE 1

| Catalyst Composition | Kaolin Clay wt. % | Zeolites wt. % | | | | Binder, wt. % | |
| --- | --- | --- | --- | --- | --- | --- | --- |
| | | ZSM-5 (SAR 30) | ZSM-5 (SAR 50) | ZSM-5 (SAR 80) | ZSM-5 (SAR 280) | $Al_2Cl(OH)_5$ | Ludox AS-40 |
| A | 30 | 50 | — | — | — | 10 | 10 |
| 1 | 30 | 10 | 20 | 20 | — | 10 | 10 |
| 2 | 30 | 20 | 10 | 20 | — | 10 | 10 |
| 3 | 30 | 20 | 20 | 10 | — | 10 | 10 |
| 4 | 30 | — | 10 | 20 | 20 | 10 | 10 |
| 5 | 30 | — | 20 | 10 | 20 | 10 | 10 |
| 6 | 30 | — | 20 | 20 | 10 | 10 | 10 |
| 7 | 30 | 10 | — | 20 | 20 | 10 | 10 |
| 8 | 30 | 20 | — | 10 | 20 | 10 | 10 |
| 9 | 30 | 20 | — | 20 | 10 | 10 | 10 |
| 10 | 30 | 25 | — | — | 25 | 10 | 10 |
| 11 | 30 | 10 | — | — | 40 | 10 | 10 |
| 12 | 30 | 40 | — | — | 10 | 10 | 10 |

TABLE 2

| Catalyst Composition | Kaolin Clay wt. % | Zeolite wt. % | Binder, wt. % | |
| --- | --- | --- | --- | --- |
| | | USY Zeolite (SAR 30) | $Al_2Cl(OH)_5$ | Ludox AS-40 |
| B | 30 | 50 | 10 | 10 |

Example 2—Catalytic Testing

A micro-activity testing (MAT) unit was used to determine the conversion and selectivity of the catalyst compositions produced in Example 1. All catalyst compositions from Table 1 were mixed with an amount of particles of catalyst composition B from table 2. The final formulation used in testing was obtained by physical mixing a 50:50 weight ratio of both particles. Prior to catalytic testing, all catalyst compositions were hydrothermally treated at 810° C. for 2-3 hours under 100% steam. The testing was performed with a catalyst-to-oil ratio of 5. Arabian light crude oil was added to the reactor over a 30 seconds time on stream and the reaction was conducted at 500° C. The results of the catalytic testing are displayed in Table 3.

TABLE 3

| Catalyst Composition | Conversion (%) | Yield (wt. %) | | | | |
| --- | --- | --- | --- | --- | --- | --- |
| | | C2-C4 Light Olefins | Light Paraffins | LCO | HCO | Gasoline |
| A | 86.17 | 26.87 | 12.39 | 10.73 | 3.09 | 39.63 |
| 1 | 82.76 | 23.75 | 10.90 | 12.75 | 4.49 | 41.6 |
| 2 | 85.32 | 25.85 | 11.74 | 11.08 | 3.6 | 42.3 |
| 3 | 82.41 | 24.57 | 9.76 | 13.11 | 4.47 | 42.1 |
| 4 | 83.10 | 25.40 | 10.39 | 12.36 | 4.54 | 42.3 |
| 5 | 84.56 | 25.11 | 10.76 | 11.77 | 3.67 | 43.9 |
| 6 | 82.79 | 24.39 | 10.79 | 12.73 | 4.48 | 41.9 |
| 7 | 84.23 | 26.99 | 10.86 | 11.74 | 4.03 | 41.0 |
| 8 | 81.22 | 23.30 | 10.03 | 13.85 | 4.93 | 41.7 |
| 9 | 82.40 | 25.35 | 10.43 | 12.92 | 4.68 | 41.9 |
| 10 | 84.81 | 26.06 | 12.66 | 11.60 | 3.59 | 39.91 |
| 11 | 81.47 | 24.48 | 10.30 | 13.84 | 4.68 | 40.85 |
| 12 | 85.30 | 27.22 | 13.73 | 11.12 | 3.59 | 38.89 |

As shown in Table 3, the overall conversion of Examples 1-12, was similar to that of Comparative Example A, which comprised only a single portion of zeolite with a single SAR.

All of the Examples except Example 12 had a higher gasoline yield than that of Comparative Example A with some Examples, such as Example 7, having both improved gasoline yield as well as higher light olefin yield. Overall Examples 1-12 indicate that by balancing the ratio of zeolites with different SARs one can improve selectivity towards a target product or products without sacrificing the overall conversion of the reaction.

The present disclosure includes numerous aspects. A first aspect is a catalyst composition comprising from 10 wt. % to 50 wt. % of matrix material, from 10 wt. % to 30 wt. % of binder, and from 30 wt. % to 70 wt. % of a zeolite mixture. The zeolite mixture may comprise all zeolite in the catalyst composition. The zeolite mixture may comprise at least a first portion of zeolite and a second portion of zeolite. The first portion of zeolite may consist of zeolite having a silica to alumina molar ratio in a first range and may comprise at least 10 wt. % of the zeolite mixture. The second portion of zeolite may consist of zeolite having a silica to alumina molar ratio in a second range and comprises at least 10 wt. % of the zeolite mixture. The silica to alumina molar ratio range of the first portion of zeolite and the silica to alumina molar ratio range of the second portion of zeolite do not overlap and may be separated by at least 5. The midpoint of the silica to alumina molar ratio range of the second portion of zeolite less the midpoint of the silica to alumina molar ratio range of the first portion of zeolite may equal at least 15.

Another aspect is any previous aspect or combination of previous aspects, wherein the silica to alumina molar ratio of the first portion of zeolite is from 25 to 35 and the silica to alumina molar ratio of the second portion of zeolite is from 250 to 300.

Another aspect is any previous aspect or combination of previous aspects, wherein the zeolite mixture further comprises a third portion of zeolite, wherein: the third portion of zeolite consists of zeolite having a silica to alumina molar ratio in a third range, the silica to alumina molar ratio range of the third portion of zeolite and the silica to alumina molar ratio range of the second portion of zeolite do not overlap, and the midpoint of the silica to alumina molar ratio range of the third portion of zeolite less the midpoint of the silica to alumina molar ratio range of the second portion of zeolite equals at least 15.

Another aspect is any previous aspect or combination of previous aspects, wherein the silica to alumina molar ratio of the first portion of zeolite is from 25 to 35, the silica to alumina molar ratio of the second portion of zeolite is from 40 to 60, and the silica to alumina molar ratio of the third portion of zeolite is from 70 to 90.

Another aspect is any previous aspect or combination of previous aspects, wherein the silica to alumina molar ratio of the first portion of zeolite is from 40 to 60, the silica to alumina molar ratio of the second portion of zeolite is from 70 to 90, and the silica to alumina molar ratio of the third portion of zeolite is from 250 to 300.

Another aspect is any previous aspect or combination of previous aspects, wherein the silica to alumina molar ratio of the first portion of zeolite is from 25 to 35, the silica to alumina molar ratio of the second portion of zeolite is from 70 to 90, and the silica to alumina molar ratio of the third portion of zeolite is from 250 to 300.

Another aspect is any previous aspect or combination of previous aspects, wherein the zeolite mixture further comprises a fourth portion of zeolite, wherein: the fourth portion of zeolite consists of zeolite having a silica to alumina molar ratio in a fourth range, the silica to alumina molar ratio range of the fourth portion of zeolite and the silica to alumina molar ratio range of the third portion of zeolite do not overlap, and the midpoint of the silica to alumina molar ratio range of the fourth portion of zeolite less the midpoint of the silica to alumina molar ratio range of the third portion of zeolite equals at least 15.

Another aspect is any previous aspect or combination of previous aspects, wherein the midpoint of the silica to alumina molar ratio ranges of the first and second portion of zeolite are from 1 to 500.

Another aspect is any previous aspect or combination of previous aspects, wherein the zeolite mixture comprises ZSM-5 zeolite.

Another aspect is any previous aspect or combination of previous aspects, wherein the zeolite mixture comprises zeolite Y Another aspect is any previous aspect or combination of previous aspects, wherein the catalyst composition is formed as particles.

Another aspect is any previous aspect or combination of previous aspects, wherein the particles have an average particle size of from 0.05 microns to 100 microns.

Another aspect is any previous aspect or combination of previous aspects, wherein the first and second portions of zeolite are each present on the same particles.

Another aspect is any previous aspect or combination of previous aspects, wherein the first and second portions of zeolite are each present on separate particles.

Another aspect is any previous aspect or combination of previous aspects, wherein the matrix material is kaolin.

Another aspect is any previous aspect or combination of previous aspects, wherein the binder is silica, alumina, or combinations thereof.

Another aspect is any previous aspect or combination of previous aspects, wherein the catalyst composition further comprises from 1 wt. % to 40 wt. % of silicon carbide particles.

Another aspect is any previous aspect or combination of previous aspects, wherein the silicon carbide particles have an average particle size of from 50 nm to 900 nm.

Another aspect is any previous aspect or combination of previous aspects, wherein the catalyst composition consists essentially of from 10 wt. % to 50 wt. % of matrix material, from 10 wt. % to 30 wt. % of binder, and from 30 wt. % to 70 wt. % of a zeolite mixture. The zeolite mixture comprises all zeolite in the catalyst composition. The zeolite mixture comprises at least a first portion of zeolite and a second portion of zeolite. The first portion of zeolite consists of zeolite having a silica to alumina molar ratio in a first range and comprises at least 10 wt. % of the zeolite mixture. The second portion of zeolite consists of zeolite having a silica to alumina molar ratio in a second range and comprises at least 10 wt. % of the zeolite mixture. The silica to alumina molar ratio range of the first portion of zeolite and the silica to alumina molar ratio range of the second portion of zeolite do not overlap and are separated by at least 5. The midpoint of the silica to alumina molar ratio range of the second portion of zeolite less the midpoint of the silica to alumina molar ratio range of the first portion of zeolite is at least 15.

Another aspect is a method for processing hydrocarbons comprising passing a hydrocarbon feedstock to a reactor, contacting the hydrocarbon feedstock with the catalyst composition of any previous aspect or combination of aspects to produce a product stream, and passing the product stream out of the reactor.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

The invention claimed is:

1. A catalyst composition comprising:
from 10 wt. % to 50 wt. % of matrix material;
from 10 wt. % to 30 wt. % of binder; and
from 45 wt. % to 70 wt. % of a zeolite mixture, wherein:

the zeolite mixture comprises all zeolite in the catalyst composition;

the zeolite mixture comprises at least a first portion of zeolite and a second portion of zeolite;

the first portion of zeolite consists of zeolite having a silica to alumina molar ratio in a first range and comprises at least 10 wt. % of the zeolite mixture;

the second portion of zeolite consists of zeolite having a silica to alumina molar ratio in a second range and comprises at least 10 wt. % of the zeolite mixture;

the silica to alumina molar ratio range of the first portion of zeolite and the silica to alumina molar ratio range of the second portion of zeolite do not overlap and are separated by at least 5;

the midpoint of the silica to alumina molar ratio range of the second portion of zeolite less the midpoint of the silica to alumina molar ratio range of the first portion of zeolite equals at least 15; and wherein at least one of:

the first portion of zeolite comprises ZSM-5, and the second portion of zeolite comprises ZSM-5; or the first portion of zeolite comprises Zeolite Y, and the second portion of zeolite comprises Zeolite Y.

2. The catalyst composition of claim 1, wherein:

the silica to alumina molar ratio of the first portion of zeolite is from 25 to 35; and the silica to alumina molar ratio of the second portion of zeolite is from 250 to 300.

3. The catalyst composition of claim 1, wherein the midpoint of the silica to alumina molar ratio ranges of the first and second portion of zeolite are from 1 to 500.

4. The catalyst composition of claim 1, wherein the zeolite mixture comprises ZSM-5 zeolite, zeolite Y, or both.

5. The catalyst composition of claim 1, wherein the catalyst composition is formed as particles.

6. The catalyst composition of claim 5, wherein the particles have an average particle size of from 0.05 microns to 100 microns.

7. The catalyst composition of claim 5, wherein the first and second portions of zeolite are each present on the same particles.

8. The catalyst composition of claim 5, wherein the first and second portions of zeolite are each present on separate particles.

9. The catalyst composition of claim 1, wherein one or both of:

the matrix material is kaolin; or the binder is silica, alumina, or combinations thereof.

10. The catalyst composition of claim 1, consisting essentially of:

from 10 wt. % to 50 wt. % of the matrix material;

from 10 wt. % to 30 wt. % of the binder; and from 45 wt. % to 70 wt. % of the zeolite mixture, wherein each of the first portion of zeolite and the second portion of zeolite comprise at least 20 wt. % of the zeolite mixture.

11. A method for processing hydrocarbons, the method comprising:

passing a hydrocarbon feedstock to a reactor;

contacting the hydrocarbon feedstock with the catalyst composition of claim 1 to produce a product stream; and passing the product stream out of the reactor.

12. The catalyst composition of claim 1, wherein:

the first portion of zeolite comprises ZSM-5; and the second portion of zeolite comprises ZSM-5.

13. The catalyst composition of claim 1, wherein:

the first portion of zeolite comprises Zeolite Y; and the second portion of zeolite comprises Zeolite Y.

14. A catalyst composition comprising:

from 10 wt. % to 50 wt. % of matrix material; and from 10 wt. % to 30 wt. % of binder;

from 30 wt. % to 70 wt. % of a zeolite mixture, wherein:

the zeolite mixture comprises all zeolite in the catalyst composition;

the zeolite mixture comprises at least a first portion of zeolite and a second portion of zeolite;

the first portion of zeolite consists of zeolite having a silica to alumina molar ratio in a first range and comprises at least 10 wt. % of the zeolite mixture;

the second portion of zeolite consists of zeolite having a silica to alumina molar ratio in a second range and comprises at least 10 wt. % of the zeolite mixture;

the silica to alumina molar ratio range of the first portion of zeolite and the silica to alumina molar ratio range of the second portion of zeolite do not overlap and are separated by at least 5;

the midpoint of the silica to alumina molar ratio range of the second portion of zeolite less the midpoint of the silica to alumina molar ratio range of the first portion of zeolite equals at least 15;

the zeolite mixture further comprises a third portion of zeolite, wherein:

the third portion of zeolite consists of zeolite having a silica to alumina molar ratio in a third range;

the silica to alumina molar ratio range of the third portion of zeolite and the silica to alumina molar ratio range of the second portion of zeolite do not overlap; and the midpoint of the silica to alumina molar ratio range of the third portion of zeolite less the midpoint of the silica to alumina molar ratio range of the second portion of zeolite equals at least 15.

15. The catalyst composition of claim 14, wherein:

the silica to alumina molar ratio of the first portion of zeolite is from 25 to 35;

the silica to alumina molar ratio of the second portion of zeolite is from 40 to 60; and the silica to alumina molar ratio of the third portion of zeolite is from 70 to 90.

16. The catalyst composition of claim 14, wherein:

the silica to alumina molar ratio of the first portion of zeolite is from 40 to 60;

the silica to alumina molar ratio of the second portion of zeolite is from 70 to 90; and the silica to alumina molar ratio of the third portion of zeolite is from 250 to 300.

17. The catalyst composition of claim 14, wherein:

the silica to alumina molar ratio of the first portion of zeolite is from 25 to 35;

the silica to alumina molar ratio of the second portion of zeolite is from 70 to 90; and the silica to alumina molar ratio of the third portion of zeolite is from 250 to 300.

18. The catalyst composition of claim 14, wherein the zeolite mixture further comprises a fourth portion of zeolite, wherein:

the fourth portion of zeolite consists of zeolite having a silica to alumina molar ratio in a fourth range;

the silica to alumina molar ratio range of the fourth portion of zeolite and the silica to alumina molar ratio range of the third portion of zeolite do not overlap; and the midpoint of the silica to alumina molar ratio range of the fourth portion of zeolite less the midpoint of the silica to alumina molar ratio range of the third portion of zeolite equals at least 15.

19. A catalyst composition comprising:

from 10 wt. % to 50 wt. % of matrix material;

from 10 wt. % to 30 wt. % of binder;

from 1 wt. % to 40 wt. % of silicon carbide particles; and from 30 wt. % to 70 wt. % of a zeolite mixture, wherein:

the zeolite mixture comprises all zeolite in the catalyst composition;

the zeolite mixture comprises at least a first portion of zeolite and a second portion of zeolite;

the first portion of zeolite consists of zeolite having a silica to alumina molar ratio in a first range and comprises at least 10 wt. % of the zeolite mixture;

the second portion of zeolite consists of zeolite having a silica to alumina molar ratio in a second range and comprises at least 10 wt. % of the zeolite mixture;

the silica to alumina molar ratio range of the first portion of zeolite and the silica to alumina molar ratio range of the second portion of zeolite do not overlap and are separated by at least 5;

the midpoint of the silica to alumina molar ratio range of the second portion of zeolite less the midpoint of the silica to alumina molar ratio range of the first portion of zeolite equals at least 15.

20. The catalyst composition of claim 19, wherein the silicon carbide particles have an average particle size of from 50 nm to 900 nm.

\* \* \* \* \*